United States Patent
Ivanov et al.

(10) Patent No.: US 10,074,270 B2
(45) Date of Patent: Sep. 11, 2018

(54) CLUSTERING OBSERVATIONS OF OBJECTS ALONG ROADS FOR NAVIGATION-RELATED OPERATIONS

(71) Applicant: HARMAN BECKER AUTOMOTIVE SYSTEMS GMBH, Karlsbad-Ittersbach OT (DE)

(72) Inventors: Volodymyr Ivanov, Odelzhausen (DE); Alexey Pryakhin, Munich (DE); Ievgenii Borshch, Munich (DE)

(73) Assignee: HARMAN BECKER AUTOMOTIVE SYSTEMS GMBH, Karlsbad-Ittersbach (DE)

(*) Notice: Subject to any disclaimer, the term of this patent is extended or adjusted under 35 U.S.C. 154(b) by 0 days.

(21) Appl. No.: 15/653,321

(22) Filed: Jul. 18, 2017

(65) Prior Publication Data

US 2018/0025628 A1    Jan. 25, 2018

Related U.S. Application Data

(60) Provisional application No. 62/364,805, filed on Jul. 20, 2016.

(51) Int. Cl.
| | |
|---|---|
| *G08G 1/01* | (2006.01) |
| *G01C 21/26* | (2006.01) |
| *G08G 1/0967* | (2006.01) |
| *G01S 19/51* | (2010.01) |
| *G08G 1/00* | (2006.01) |

(52) U.S. Cl.
CPC ........... *G08G 1/0104* (2013.01); *G01C 21/26* (2013.01); *G01S 19/51* (2013.01); *G08G 1/096716* (2013.01); *G08G 1/20* (2013.01)

(58) Field of Classification Search
CPC . G08G 1/01; G08G 1/20; G01C 21/26; G01S 19/50
USPC .......................................................... 701/117
See application file for complete search history.

(56) References Cited

U.S. PATENT DOCUMENTS

| | | | |
|---|---|---|---|
| 6,856,897 B1 * | 2/2005 | Phuyal et al. ......... | G01C 21/28 701/461 |
| 8,731,305 B1 * | 5/2014 | Mantri .................. | 382/197 |
| 9,361,797 B1 * | 6/2016 | Chen et al. ............ | G06F 19/00 |
| 2017/0332198 A1 * | 11/2017 | Dannenbring et al. ..................... | H04W 4/02 |

* cited by examiner

*Primary Examiner* — Tan Quang Nguyen
(74) *Attorney, Agent, or Firm* — Artegis Law Group, LLP (57) ABSTRACT

In one embodiment, a cluster application generates navigation-related data based on observations received from vehicles. In operation, the cluster application computes an oriented distance between two observed object positions based on a heading, where each observed object position is associated with a different one of two observations. The cluster application then generates a cluster that includes the two observations based on the oriented distance. Subsequently, the cluster application computes an object position that is associated with the cluster based on the two observations. The cluster application transmits the object position and at least one characteristic associated with the observations to a update application that generates an update to a road database. Because the cluster application computes the object position based on multiple observations that are likely of a single object, the object position associated with the cluster may be more reliable than the observed object positions.

20 Claims, 4 Drawing Sheets

CLUSTERING OBSERVATIONS OF OBJECTS ALONG ROADS FOR NAVIGATION-RELATED OPERATIONS

CROSS-REFERENCE TO RELATED APPLICATIONS

This application claims benefit of the U.S. Provisional Patent Application having Ser. No. 62/364,805 and filed on Jul. 20, 2016. The subject matter of this related application is hereby incorporated herein by reference.

BACKGROUND

Field of the Various Embodiments

The various embodiments relate generally to navigation subsystems and, more specifically, to clustering observations of objects along roads for navigation-related operations.

Description of the Related Art

Many vehicles include navigation applications that perform navigation-related activities based on satellite navigation devices (e.g., global positioning system devices) and road databases that specify underlying, physical road networks and associated navigation-related data. For example, a road database could include speed limits at different points along each road to enable a navigation subsystem to estimate travel times, etc. However, over time, the navigation-related data may change. For instance, the speed limit associated with a portion of a road may be reduced. Accordingly, in an effort to provide road databases that are up-to-date and accurate, some providers of road databases generate updates that specify changes to navigation-related data.

In one approach to generating updates, providers of road databases rely on real-time observations received from numerous vehicles traveling along roads. Typically, each observation includes one or more characteristics associated with an observed object based on data collected by various sensors. Examples of characteristics associated with an observed sign include an estimated position of the vehicle at the time of the observation, an estimated speed of the vehicle at the time of the observation, and an estimated type of the observed object, to name a few.

One limitation of observations is that the characteristics are dependent on the accuracy of sensors, driving conditions, road conditions, and so forth. Consequently, the characteristics are prone to errors. For example, the estimated position of the vehicle could be inaccurate by as much as 400 meters when an vehicle is moving relatively fast. In another example, a camera included in an vehicle could perform pattern recognition operations on an image to identify a speed limit sign specifying 30 miles per hour. However, if the view of the camera is obscured by another vehicle or the sun is shining brightly, then the camera could incorrectly identify the speed limit sign as specifying 80 miles per hour.

In operation, because observations are not necessarily reliable, the providers of the road databases are oftentimes discouraged from generating updates based on real-time observations. Instead, the providers typically resort to generating updates based on more time consuming data collection operations that produce acceptably reliable data. As a result, the length of time between updates to road databases may be undesirably long. For example, a provider of a road database could provide an update every 6 months. Between updates, the quality of the navigation-related data included in road databases may be degraded, and the associated navigation applications may provide inaccurate navigation information.

As the foregoing illustrates, more effective techniques for generating navigation-related data would be useful.

SUMMARY

One embodiment sets forth a method for generating navigation-related data, The method includes computing a first oriented distance between a first observed object position and a second observed object position based on a first heading, where the first observed object position and the first heading are associated with a first observation received from a first vehicle, and the second observed object position is associated with a second observation received from a second vehicle; generating, based on the first oriented distance, a first cluster that includes the first observation and the second observation; computing an object position associated with the first cluster based on at least the first observation and the second observation; and transmitting the object position and at least one characteristic associated with the first observation to an update application, where the update application generates an update to a road database.

Further embodiments provide, among other things, a system and a computer-readable medium configured to implement the method set forth above.

At least one advantage of the disclosed techniques is that because the cluster is generated based on multiple observations of an object, the characteristics associated with the cluster are typically more accurate than the characteristics associated with each of the individual observations. Further, observations that are likely to be inaccurate are not included in the clusters and, consequently, the clusters include less noise that the observations. As a result, the update application is able to generate acceptably accurate real-time updates to road databases relative to conventional approaches, which are typically based on potentially inaccurate observations and/or which commonly require time consuming data operations that preclude generating updates in real-time.

BRIEF DESCRIPTION OF THE DRAWINGS

So that the manner in which the above recited features can be understood in detail, a more particular description of the various embodiments, briefly summarized above, may be had by reference to certain embodiments, some of which are illustrated in the appended drawings. It is to be noted, however, that the appended drawings illustrate only typical embodiments and are therefore not to be considered limiting of scope, for the contemplated embodiments may admit to other equally effective embodiments.

DETAILED DESCRIPTION

In the following description, numerous specific details are set forth to provide a more thorough understanding of the various embodiments. However, it will be apparent to one of skill in the art that various embodiments may be practiced without one or more of these specific details.

Road Database Update System

Figure 1:
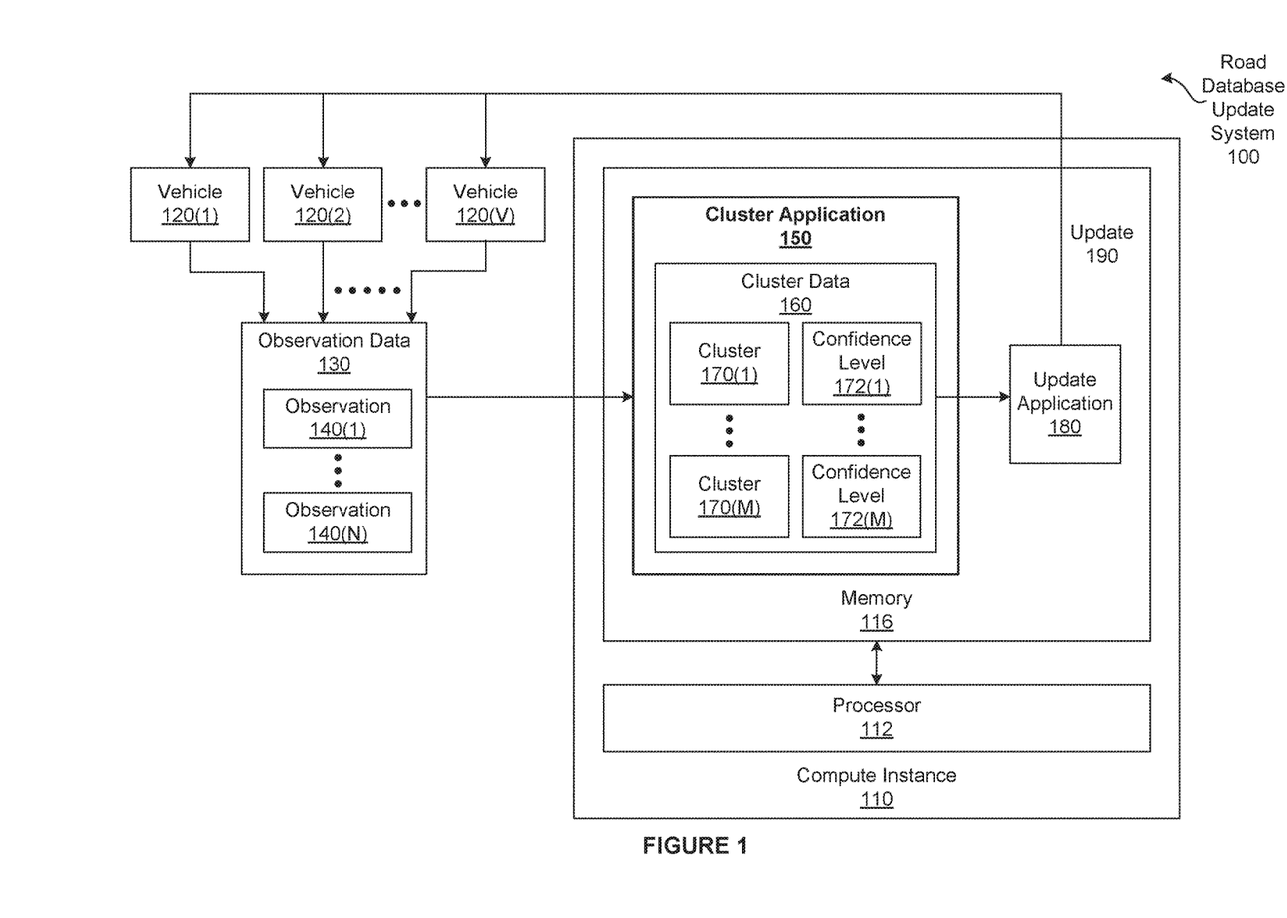
FIG. 1 illustrates a road database update system configured to implement one or more aspects of the various embodiments.

FIG. 1 illustrates a road database update system 100 configured to implement one or more aspects of the various embodiments. As shown, the road database update system 100 includes, without limitation, vehicles 120, observation data 130, and a compute instance 110. In alternate embodiments, the road database update system 100 may include any number (including zero) of vehicles 120 and compute instances 110. For explanatory purposes, multiple instances of like objects are denoted with reference numbers identifying the object and parenthetical numbers identifying the instance where needed.

Although not shown in FIG. 1, each of the vehicles 120 may include a navigation application that enables a user to perform navigation-related operations (e.g., viewing maps, generating and viewing directions and travel times, etc.) based on an associated road database and sensor data. The road database specifies underlying, physical road networks and associated navigation-related data. The sensor data provides feedback involving the vehicle 120 and the surrounding environment that enables the driver to efficiently and safely operate the vehicle 120. For instance, the navigation application that is included in the vehicle 120(1) enables the driver of the vehicle 120(1) to efficiently navigate the vehicle 120(1) via a road database and global positioning system (GPS) data received from a satellite navigation device associated with the vehicle 120(1).

For each vehicle 120, the navigation application and the associated road database are typically stored in memory included in the vehicle 120. In alternate embodiments, each navigation application may access any road database in any technically feasible fashion. For instance, a navigation application included in the vehicle 120(2) may access a road database via the Internet. However, over time, navigation-related data may change. For instance the speed limit associated with a portion of a road may be reduced. As a result, the road databases may become inaccurate, and associated navigation applications may provide inaccurate navigation information to users. In an effort to provide road databases that are up-to-date and accurate, some providers of road databases generate conventional updates to the road databases that specify changes to navigation-related data based on the sensor data.

In general, each of the vehicles 120 may include any number and type of sensors (not shown) that generate sensor data. For example, the sensors may include a satellite navigation device, a camera, an odometer, and wheels sensors, to name a few. The satellite navigation device could provide GPS data that specifies the vehicle position and, based on multiple vehicle positions over time, an overall vehicle heading. The camera could perform pattern recognition operations on images received as the automotive 170 travels along a road in an attempt to identify road signs. The odometer could provide a current speed of the vehicle 120. The wheel sensors could provide a current vehicle heading.

As the vehicles 120 operate, in addition to providing the sensor data to the associated navigation application, the vehicles 120 may be configured to transmit sensor data to any number of applications as the observation data 130. As shown, the observation data 130 includes, without limitation, any number of observations 140. Each of the observations 140 specifies, without limitation, any number of characteristics associated with an observed object based on the sensor data and a timestamp that specifies the point in time at which the observation 140 was made.

Examples of characteristics associated with an observed sign include an estimated position of the vehicle 120, an estimated heading of the vehicle 120, and an estimated type of the observed object, to name a few. For example, the observation 140(1) could specify that, traveling north at a speed of 90 miles per hour, the vehicle 120 identified a speed limit sign specifying 70 miles per hour. As a general matter, the vehicles 120 generate and transmit the observations 140 as the sensor data is generated (i.e., in "real-time").

In one conventional approach to providing accurate navigation-related data, a conventional update application receives the observation data 130 and generates a conventional update based on all of the observations 140 included in the observation data 130. However, one limitation of the observations 140 is that the specified characteristics are dependent on the accuracy of sensors, driving conditions, and road conditions, and so forth. Consequently, the characteristics are prone to errors. For example, the estimated position of the vehicle 120 could be inaccurate by as much as 400 meters when the vehicle 120 is moving relatively fast. In another example, a camera included in the vehicle 120(1) could perform pattern recognition operations on an image to identify a speed limit sign specifying 30 miles per hour. However, if the view of the camera is obscured by the vehicle 120(2) or the sun is shining brightly, then the camera could incorrectly identify the speed limit sign as specifying 80 miles per hour.

Because the observations 140 are not necessarily reliable, the providers of road databases are oftentimes discouraged from generating conventional updates based on the observations 140. Instead, the providers typically resort to generating conventional updates based on more time consuming data collection operations that produce acceptably reliable data. As a result, the length of time between conventional updates to road databases may be undesirably long. For example, a provider of a road database could provide a new conventional update every 6 months. Between the conventional updates, the quality of the navigation-related data included in the road databases may be degraded, and associated navigation applications may provide inaccurate navigation information.

Efficiency Generating Accurate Updates to Road Databases

To provide acceptably accurate navigation-related data via updates 190 without unacceptably increasing the time required to generate the updates 190, the road database update system 100 includes a cluster application 150. In general, the cluster application 150 generates cluster data 160 based on the observation data 130. As shown, the cluster data 160 includes, without limitation, clusters 170 and confidence levels 172. Each of the clusters 170 specifies one or more characteristics associated with an observed object based on one or more of the observations 140 that are likely of the observed object. Further, in various embodiments, each of the observations 140 is included in at most one of the clusters 170. Consequently, in such embodiments, a total number of the clusters 170 is no greater than the total number of the observations 140. Each of the confidence levels 172 estimates an accuracy of the characteristics specified in an associated cluster 170. Further, in various embodiments, a total number of the confidence levels 172 equals the total number of the clusters 170.

In operation, the cluster application 150 evaluates the observation data 130 to identify sets of the observations 140 that are likely of one observed object. As part of evaluating the observation data 130, the cluster application 150 discards any observations 140 that are inconsistent with physical properties of the vehicles 120 or with respect to a context of the observation data 130. The cluster application 150 then performs oriented density-based clustering operations to generate the clusters 170. In general, and as described in detail in conjunction with FIG. 2, the cluster application 150 identifies sets of "similar" observations 140, where the observations 130 included in each of the sets specify similar characteristics (e.g., sign type, etc.). For each set of similar observations 140, the cluster application performs cluster operations on the observations 130 based on oriented distances to generate the clusters 170. Each oriented distance reflects an estimated travel distance between observed object positions, where the travel distance is consistent with an estimated heading of a road.

In this fashion, the cluster application 150 ensures that each of the clusters 170 specifies the observations 140 that are likely of a single observed object. The cluster application 150 then determines one or more characteristics specified in the cluster 170 based on the associated observations 140. In particular, the cluster application 150 computes an object position based on fitting the associated observed object positions to a Gaussian distribution. In alternate embodiments, the cluster application 150 may generate the clusters 170 in any technically feasible fashion that reflects that the observations 140 are received from the vehicles 120 as the vehicles 120 travel along roads.

Subsequently, and for each of the clusters 170, the cluster application 150 computes the associated confidence level 172 based on an amount, frequency, and consistency of the observations 140 included in the cluster 170. Notably, as the number of observations 140 of an observed object increases, the confidence level 172 of the cluster 170 typically increases. In alternate embodiments, the cluster application 150 may compute the confidence levels 172 in any technically feasible fashion and based on any amount and type of data. In other alternate embodiments, the cluster application 150 may not generate the confidence levels 172. After the cluster application 150 generates the cluster data 160, the cluster application 150 transmits the cluster data 160 to an update application 180.

The update application 180 selects one or more of the clusters 170 based on the confidence levels 172 and generates an update 170 based on the selected clusters 170. Because the cluster application 150 generates the update 190 based on the cluster data 160 instead of directly on the observations 140, the update application 180 may generate the update 190 in real-time while ensuring that the update 190 provides reliable navigation-related information. Finally, the update application 180 transmits the update 190 to navigation applications included in the vehicles 120. Notably, the cluster application 150 and the update application 180 may be configured to generate and transmit the updates 190 much more frequently than conventional update applications. Consequently, unlike navigation applications that receive conventional updates, the navigation applications included in the vehicles 120 are able to perform navigation-related operations based on accurate navigation-related information at any given time.

As shown, the cluster application 150 and the update application 180 reside in a memory 116 that is included in the compute instance 110 and executes on a processor 112 that is included in the compute instance 110. In alternate embodiments, the road database update system 100 may include any number of compute instances 110, any number of memories 116, and any number of processors 112 that are implemented in any technically feasible fashion. Further, the cluster application 150 and the update application 180 may reside in different memories 116, execute on different processors 112, and/or be associated with different compute instances 110.

In various embodiments, the compute instance 110 may be implemented as a stand-alone chip or as part of a more comprehensive solution that is implemented as an application-specific integrated circuit (ASIC), a system-on-a-chip (SoC), and so forth. Further, the compute instance 110, the memory 116, and the processor 112 may be implemented via any number of physical resources located in any number of physical positions. For example, the cluster application 150 could be included in the compute instance 110(1) that is implemented in a laptop, and the update application 180 could be included in a compute instance 110(2) that is implemented in a cloud computing environment or a distributed computing environment.

The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112. The memory 116 may be one or more of a readily available memory, such as random access memory (RAM), read only memory (ROM), floppy disk, hard disk, or any other form of digital storage, local or remote.

In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, cloud storage, a Blu-ray Disc, other tangible storage media, or any suitable combination of the foregoing.

It will be appreciated that the road database update system 100 shown herein is illustrative and that variations and modifications are possible. The number of compute instances 110, the number of cluster applications 150, the number of update applications 180, the number of road databases, the number of vehicles 120, and the connection topology between the various units in road database update system 100 may be modified as desired. Each of the cluster applications 150 may be implemented in a stand-alone fashion or integrated in any other application (e.g., the update application 180) or device in any technically feasible fashion. Further, the functionality included in the cluster application 150 and the update application 180 may be divided across any number of applications that are stored and executed via any number of devices that are located in any number of physical positions. For example, the update application 180 could be included in the navigation application of the vehicle 120, and the cluster application 150 could transmit the cluster data 160 directly to the navigation application.

Generating Clusters Based on Oriented Distances

Figure 2:
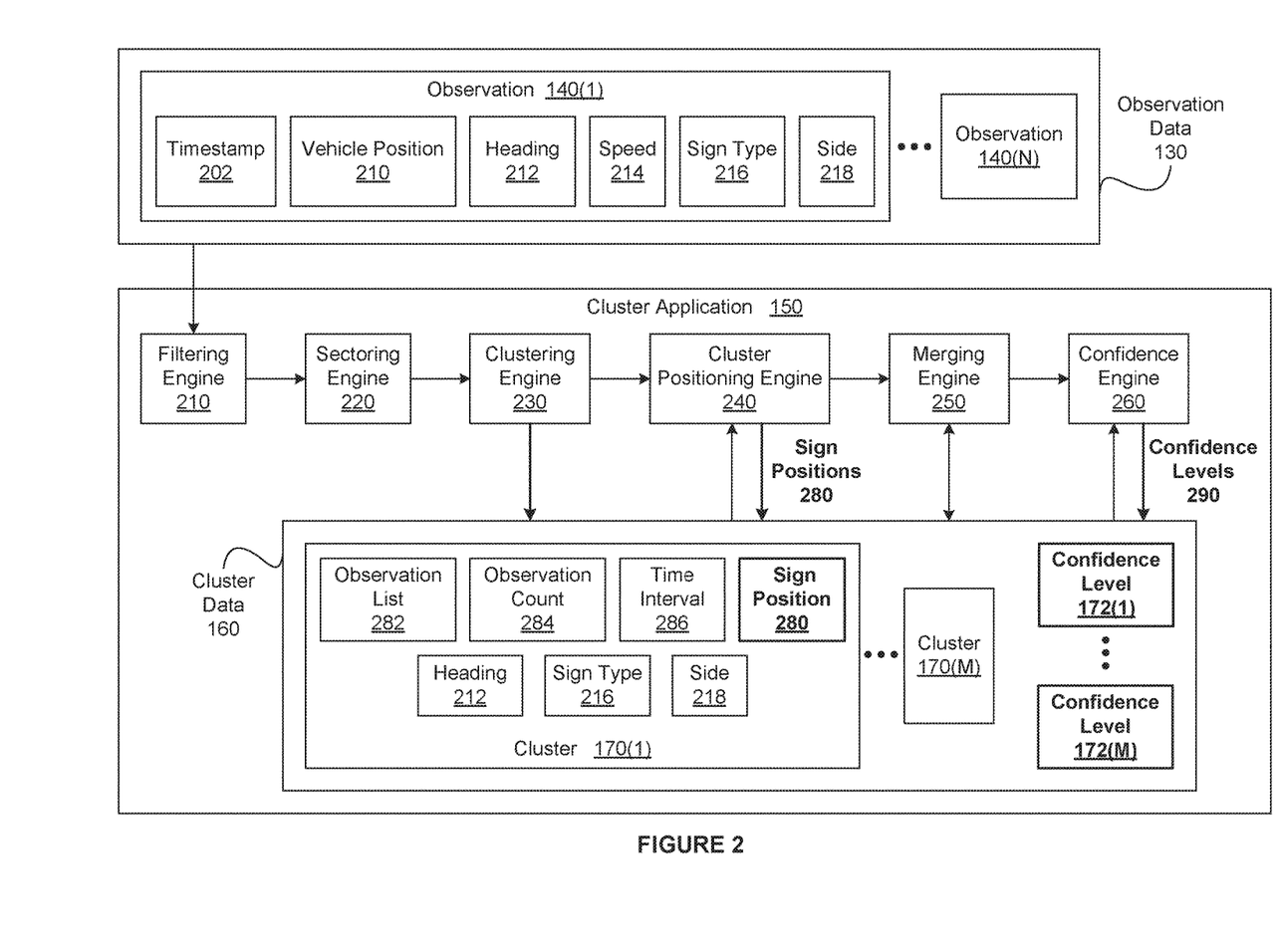
FIG. 2 is a more detailed illustration of the cluster application of FIG. 1, according to various embodiments.

FIG. 2 is a more detailed illustration of the cluster application 150 of FIG. 1, according to various embodiments. As shown, the cluster application 150 includes, without limitation, a filtering engine 210, a sectoring engine 220, a clustering engine 230, a cluster positioning engine 240, a merging engine 250, and a confidence engine 260. For explanatory purposes only, the cluster application 150 is configured to generate the clusters 170 that correspond to road signs, where each road sign lies along a road. In alternate embodiments, the cluster application 150 may be configured to generate the clusters 170 that correspond to any type of observed object.

In operation, the cluster application 150 receives the observation data 130 and generates the cluster data 160. The observation data 130 includes, without limitation, any number of observations 140, where each of the observations 140 includes, without limitation, a timestamp 202, an vehicle position 210, a heading 212, a speed 214, a sign type 216, and a side 218. As referred to herein, the timestamp 202, the vehicle position 210, the heading 212, the speed 214, the sign type 216, and the side 218 are referred to herein as "characteristics of the observation(s) 140."

In general, each of the characteristics of the observations 140 may be specified in any technically feasible fashion based on any protocol and format. In alternate embodiments, the observations 140 may omit one or more of the characteristics of the observations 140, and the cluster application 150 may derive the omitted characteristics in any technically feasible fashion. For example, the observations 140 could omit the timestamp 202, and the cluster application 150 could compute each of the timestamps 220 based on the time at which the cluster application 150 receives the associated observation 140. In another example, the observations 140 could omit the headings 212, and the cluster application 150 could compute each of the headings 212 based on any number of the observations 140 previously received from the associated vehicle 120.

The timestamp 202 specifies the time at which the associated vehicle 120 generated the observation 140. The vehicle position 210 specifies the position of the vehicle 120 at the time specified by the timestamp 202. For example, the vehicle position 210 could specify an absolute position of the vehicle 120 in GPS coordinates. The heading 212 specifies a direction in which the vehicle 120 is heading at the time specified by the timestamp 202. For example, the heading 212 could be expressed in degrees counterclockwise form a north direction. The speed 214 specifies the velocity of the vehicle 120 along the heading 212 at the time specified by the timestamp 202. For example, the speed 214 could be 90 miles per hour.

The sign type 216 specifies one or more characteristics that are associated with the observed object. For example, the sign type 216 could be "speed limit of 70 miles per hour." For explanatory purposes, as referred to herein, two signs that are mounted together are referred to herein as a single road sign that corresponds to a single observed object. For example, a modification sign that specifies "above sign applies to trucks" could be mounted directly below a primary sign that specifies "speed limit of 30 miles per hour." The modified sign and the primary sign would, together, be considered a single observed object and the associated sign type 216 would be "speed limit of 30 miles per hour for trucks."

As persons skilled in the art will recognize, oftentimes the sensors execute a variety of operations to produce estimated data that is relatively small in size and, consequently, easy to communicate in real-time. Accordingly, the sign type 216 may include any amount and type of information consistent with the sensors included in the vehicle 120. For instance, in some embodiments, a camera included in the vehicle 120 performs pattern image recognition operations on an image to generate the sign type 216. Notably, the sign type 216 requires significantly less of the memory 116 to store and significantly less bandwidth to transmit than an image. The side 218 specifies a side of the associated vehicle 120 associated with the observation 140. For example, if a camera detected the a road sign along the left side of the vehicle 120, then the side 218 would be "left." In another example, if a camera detected a road sign above the vehicle 120, then the side 218 would be "above."

The filtering engine 210 receives the observation data 130 and performs any number of filtering operations that identify observations 140 that are likely to be inaccurate. The filtering engine 210 then removes the identified observations 140. The filtering engine 210 may identify the observations 140 that are likely to be inaccurate in any technically feasible fashion based on any amount and type of data. In some embodiments, the filtering engine 210 may include algorithms that identify and remove any observations 140 that are inconsistent with the physical properties of the vehicles 120. For example, the filtering engine 210 could identify and remove any of the observations 140 that specify a value of greater than 120 miles per hour for the speed 214.

In other or the same embodiments, the filtering engine 210 identifies and removes any of the observations 140 that are inconsistent with respect to the observation data 130. For instance, suppose that fifty of the observations 140(1-50) include approximately the same vehicle positions 210, headings 212, and sides 218; the observations 140(1-49) specify a sign type "speed limit of 10 miles per hour;" and the observation 140(50) specifies a sign type of "speed limit of 70 miles per hour." In some embodiments, the filtering engine 210 would identify the observation 140(50) as inconsistent, and remove the observation 140(50) from the observation data 130.

For each of the remaining observations 140 included in the observation data 130, the sectoring engine 220 generates a sector (not shown in FIG. 2) based on a mathematical model that relates an observed sign position to the vehicle position 210, the heading 212, the speed 214, and the side 218. As is well-known, a sector is a portion of a disk enclosed by two radii and an arc. In particular, the camera lies approximately at the center of the disk, the direction of the sector is based on the heading 212 and the side 218, and the central angle of the sector is based on the speed 214. Notably, as the speed 214 increases, the depth of view of the camera decreases and, consequently, the central angle of the sector decreases. The sectoring engine 220 then determines the observed sign position based on the sector. In alternate embodiments, the mathematical model may include any number and type of data. For example, the mathematical model could include additional road parameters, such as functional road class, number of lanes, etc.

The clustering engine 230 receives the observed sign positions, determines sets of "similar" observations 140, and performs density-based clustering on each set of similar observations 140 to generate the clusters 170. As shown, each of the clusters 170 includes, without limitation, the heading 212, the sign type 216, the side 218, an observation list 282, an observation count 284, a time interval 286, and a sign position 280. To determine each set of similar observations, the clustering engine 230 identifies the observations 140 that share the same sign type 216 and the same side 218, and have headings 212 that deviate from one another by at most a maximum heading deviation. The clustering engine 230 may determine the maximum heading deviation in any technically feasible fashion. For example, the clustering engine 230 could receive the maximum heading deviation via a graphical user interface (GUI).

As persons skilled in the art will recognize, "density-based clustering" refers to techniques that map data based on an evaluation criterion, form clusters of the data included in regions of relatively high density, and identify data in regions of relatively low density as outliers (e.g., noise, etc.). In operation, because each of the observations 140 is typically reported by the associated vehicle 120 traveling along a road that coincides with the associated heading 212, the clustering engine 230 performs "oriented" density-based clustering based on the observed sign positions and oriented distances. As referred to herein, an "oriented distance" specifies a distance between observed sign positions in which distances that are along the heading 212 are weighted less heavily than distances that are perpendicular to the heading 212.

For example, suppose that the heading 212 is north, the observed sign position associated with the observation 140(1) is 500 feet north of the observed sign position associated with the observation 140(2), and the observed sign position associated with the observation 140(3) is 200 feet west of the observed sign position associated with the observation 140(2). In such a scenario, the distance between the observation 140(1) and the observation 140(2) is along the heading 212, while the distance between the observation 140(1) and the observation 140(3) is perpendicular to the heading 212. Consequently, the oriented distance between observation 140(1) and 140(2) is smaller than the oriented distance between the observation 140(1) and the observation 140(3).

The clustering engine 230 may implement any type of density-based clustering operations to generate the clusters 170. For example, in some embodiments, the clustering engine 230 performs density-based clustering operations that are modified versions of operations performed as part of the well-known density-based spatial clustering of applications with noise (DBSCAN) algorithm. In alternate embodiments, the clustering engine 230 may implement any number and type of clustering operations based on any number and type of constraints to generate the clusters 170. Further, the clustering engine 230 may perform any amount of additional operations on the clusters 170 prior to, during, or subsequent to performing the density-based clustering operations. For instance, the clustering engine 230 may discard any clusters 170 that do not include a minimum number of the observations 140.

As a result of the oriented density-based clustering, each of the clusters 170 may be characterized by a rectangular shape that is oriented along a road and defines the observations 130 that are likely associated with a single road sign. For each of the clusters 170, the clustering engine 230 sets the observation list 282 to specify the observations 140 that are included in the region of relatively high density that defines the cluster 170. In a complementary fashion, the clustering engine 230 sets the observation count 284 to specify the total number of observations 140 included in the observation list 282. The clustering engine 230 then sets the sign type 216 and the side 218 of the cluster 170 equal to, respectively, the shared sign type 216 and the shared side 218 of the observations 140 included in the observation list 282. The clustering engine 230 may set the heading 212 in any technically feasible fashion. For example, the clustering engine 230 could set the heading 212 to the average of the headings 212 of the observations 140 included in the observation list 282.

Finally, for each of the clusters 170, the clustering engine 230 sets the time interval 286 to reflect the earliest timestamp 202 and the latest timestamp 202 specified in the observations 140 included in the observation list 282. In this fashion, the clusters 170 enable the confidence engine 260 and other applications (e.g., the update application 180) to identify any of the clusters 170 that are associated with out-of-date observations 140. For example, if a road sign is replaced at a replacement time, then the time interval 286 specified in a corresponding cluster 170 would specify a latest time that is earlier than the replacement time.

For each of the clusters 170, the cluster positioning engine 240 computes the sign position 280 based on the observed sign positions of the observations 140 included in the observation list 282. More specifically, the cluster positioning engine 240 fits the observed sign positions into a Gaussian distribution and then sets the sign position 280 to the median of the Gaussian distribution. In alternate embodiments, the cluster positioning engine 240 may compute the sign positions 280 in any technically feasible fashion.

To properly handle various types of unusual cases, the merging engine 250 could identify any of the clusters 170 that are likely associated with a single physical or logical sign and merge the identified cluster(s) 170 into a single target cluster 170. As referred to herein, a "logical sign" may comprise any number of physical signs that are considered a single sign for the purposes of navigating a road. For example, a bi-sided road sign is a single logical sign that comprises two physical signs. More precisely, a "bi-sided" road sign corresponds to two physical signs that specify the same information, where the physical signs are observed on different sides of the vehicles 170 and are oriented in approximately the same direction along the road. If the merging engine 250 identifies two of the clusters 170 that are associated with similar headings 212, sign types 216, and sign positions 280, then the merging engine 250 may attempt to form a target cluster 170.

As part of forming the target cluster 170, the merging engine 250 combines the observations lists 282 of the identified clusters 170, sums the observation counts 284 of the identified clusters 170, and sets the side 218 to bi-sided. The merging engine 250 may set the sign position 280 included in the target cluster 170 in any technically feasible fashion. For instance, in some embodiments, the merging engine 250 may set the sign position 280 included in the target cluster 170 to the average of the sign positions 280 included in the identified clusters 170. In the same or other embodiments, the merging engine 250 may set a "merged cluster list" that is associated with target cluster 170 to point to the two identified clusters 170. In other embodiments, the merging engine 250 may discard the two identified clusters 170.

Finally, the confidence engine 260 computes the confidence levels 172 based on the observation counts 284, the sides 218, and the consistency of the observations 140 specified in the observation lists 282. More specifically, in some embodiments, the confidence engine 260 may compute the confidence level 172(i) associated with the cluster 170(i) based on any of the following criteria:

- the sum of the observation counts 284 included in all the clusters 270
- the observation count 284 included in the cluster 270(i)
- the last time included in the time interval 286(i) compared to the last time specified in the time intervals 286 included in nearby clusters 270
- the total number of the clusters 270 that include the sign type 216 equal to bi-sided the total number of the observations 140 specified in the observation list 282(i) that include the sign type 216 equal to bi-sided In general, as the observation count 282(i) increases, the confidence level 172(i) increases. Similarly, as the ratio of the observation count 282(i) to the sum of the observation counts 284 included in all the clusters 270 increases, the confidence level 172(i) increases. By contrast, as the difference between a current time and the last time specified in the time interval 286(i) increases, the confidence level 172(i) decreases. If the sign type 216 of the cluster 170(i) equals bi-sided, then as the number of observations 140 specified in the observation list 282(i) that include the sign type 216 equal to bi-sided increases, the confidence level 172(i) increases.

Further, if the cluster 270(i) is the result of merging operations and the sign type 216 of the cluster 270(i) is equal to bi-sided, then the confidence engine 260 adjusts the confidence level 172(i) based on the properties of the associated merged clusters 270. In particular, if the sign type 216 specified in one of the merged clusters 270 is equal to left and the sign type 216 specified in the other merged cluster 270 is equal to right, then the confidence engine 260 reduces the confidence level 172(i). By contrast, if one of the sign types 216 specified in the merged clusters 270 is equal to bi-sided, then the confidence engine 260 sets the confidence level 172(i) equal to the confidence level 172 of the bi-sided merged cluster 270.

Note that the techniques described herein are illustrative rather than restrictive, and may be altered without departing from the broader spirit and scope of the contemplated embodiments. Many modifications and variations on the functionality provided by the cluster application 150 will be apparent to those of ordinary skill in the art without departing from the scope and spirit of the described embodiments. For instance, in some embodiments, the cluster application 150 may not compute the confidence levels 172. In other embodiments, the cluster application 150 may compute the confidence levels 172 and then discard any of the clusters 170 that are associated with the confidence level 172 that is less than an predetermined minimum confidence.

Figure 3:
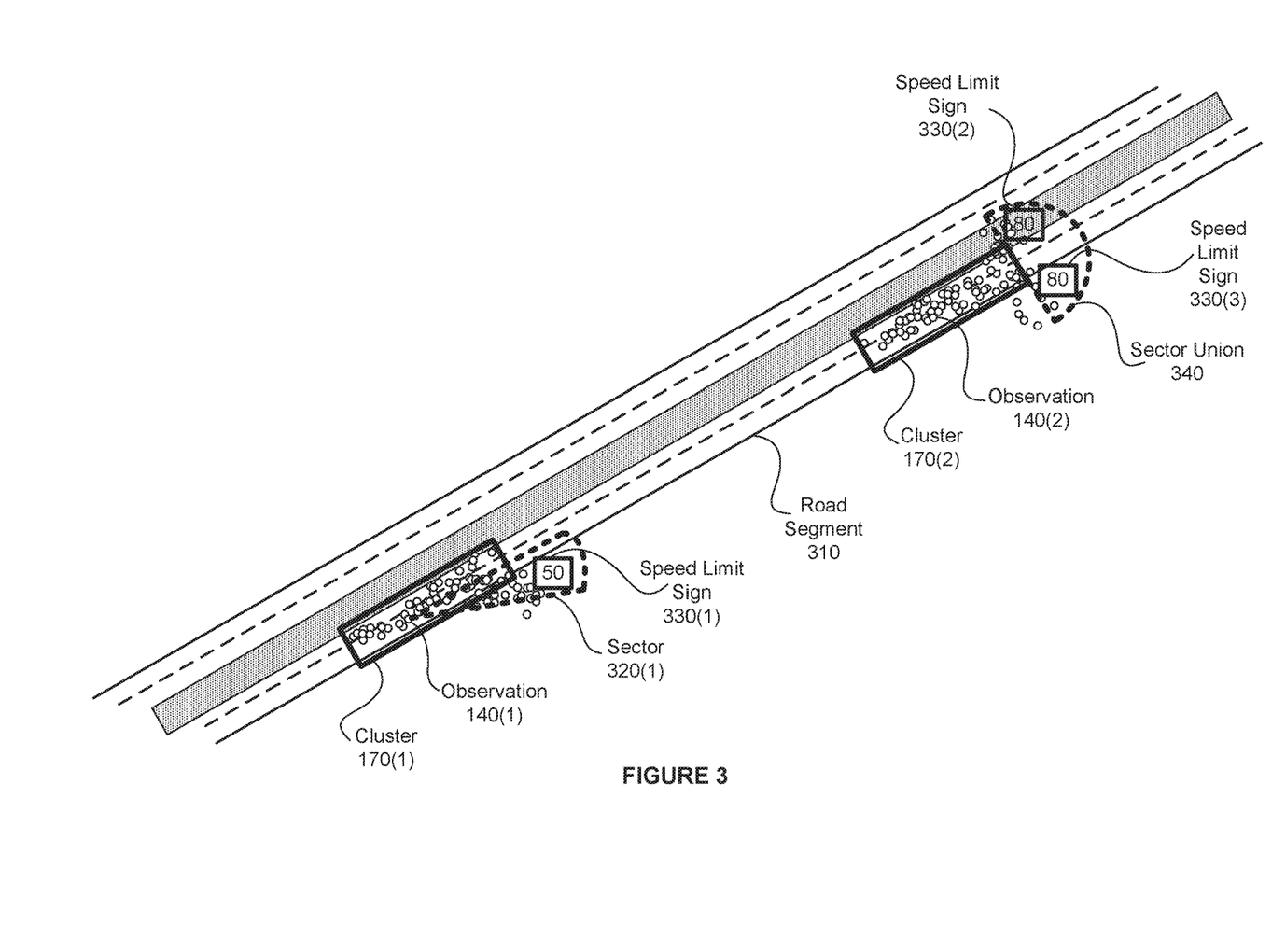
FIG. 3 illustrates examples of the clusters of FIG. 2, according to various embodiments.

FIG. 3 illustrates examples of the clusters 170 of FIG. 2, according to various embodiments. As shown, the three speed limit signs 330(1), 330(2), and 330(3) lie along a right half of a divided road and are visible to the vehicles 120 traveling in a north east direction along the road. Each of the observations 140 included in the observation data 130 is depicted as a small, unfilled circle and the clusters 170(1) and 170(2) are depicted as unfilled rectangles that surround the observations 130 included in the associated observation lists 282(1) and 282(2).

As shown, the cluster 170(1) corresponds to a speed limit sign 330(1) that is located on the right side of the road and specifies 50 miles per hour. Accordingly, the sign type 216(1) and the side 218(1) included in the cluster 170(1) are, respectively, "speed limit of 50 miles per hour" and "right." The cluster 170(1) is depicted as an unfilled rectangle that is oriented along the road. The observation list 282(1) included in the cluster 170(1) specifies the observations 140 that lie within the unfilled rectangle that depicts the cluster 170(1). As part of generating the cluster 170(1), for each of the observations 140, the sectoring engine 220 generates a sector 320. The sector 320(1) associated with the observation 140(1) that is included in the observation list 282(1) is depicted as dotted region, and the speed limit sign 330(1) lies within the dotted region.

By contrast, the cluster 170(2) corresponds to two speed limit sign 330(2) and 330(3) that are on, respectively, a left median of the road and the right side of the road. The speed limit signs 220(2) and 330(3) both specify 80 miles per hour. Accordingly, the sign type 216(2) and the side 218(2) included in the cluster 170(2) are, respectively, "speed limit of 80 miles per hour" and "bi-sided." Although not shown, the merging engine 250 generates the cluster 170(2) based on the cluster 170(3) that corresponds to the speed limit sign 330(2) and the cluster 170(4) that corresponds to the speed limit sign 330(3). The sign type 216(3) and the side 218(3) included in the cluster 170(3) are, respectively, "speed limit of 80 miles per hour" and "left." The sign type 216(4) and the side 218(4) included in the cluster 170(4) are, respectively, "speed limit of 80 miles per hour" and "right."

As part of generating the cluster 170(2), the merging engine 250 performs a union operation between the observation list 282(3) included in the cluster 170(3) and the observation list 282(4) included in the cluster 170(4) to generate the observation list 282(2) included in the cluster 170(2). The observation list 282(2) specifies the observations 140 that lie within the unfilled rectangle that depicts the cluster 170(2). As part of generating the cluster 170(2), for each of the observations 140, the sectoring engine 220 generates a different sector 320. For explanatory purposes only, a sector union 340 of the sectors 320 associated with the observations 140 included in the observation list 282(2) is depicted as a dotted semi-ellipsoidal region. Both the speed limit sign 330(2) and the speed limit sign 330(3) lie within the dotted semi-ellipsoidal region. As persons skilled in the art will recognize, the union of the sectors 230 associated with the observations 140 included in the observation list 282(3) comprise a left half of the dotted semi-ellipsoidal region. By contrast, the union of the sectors 230 associated with the observations 140 included in the observation list 282(4) comprise a right half of the dotted semi-ellipsoidal region.

Figure 4:
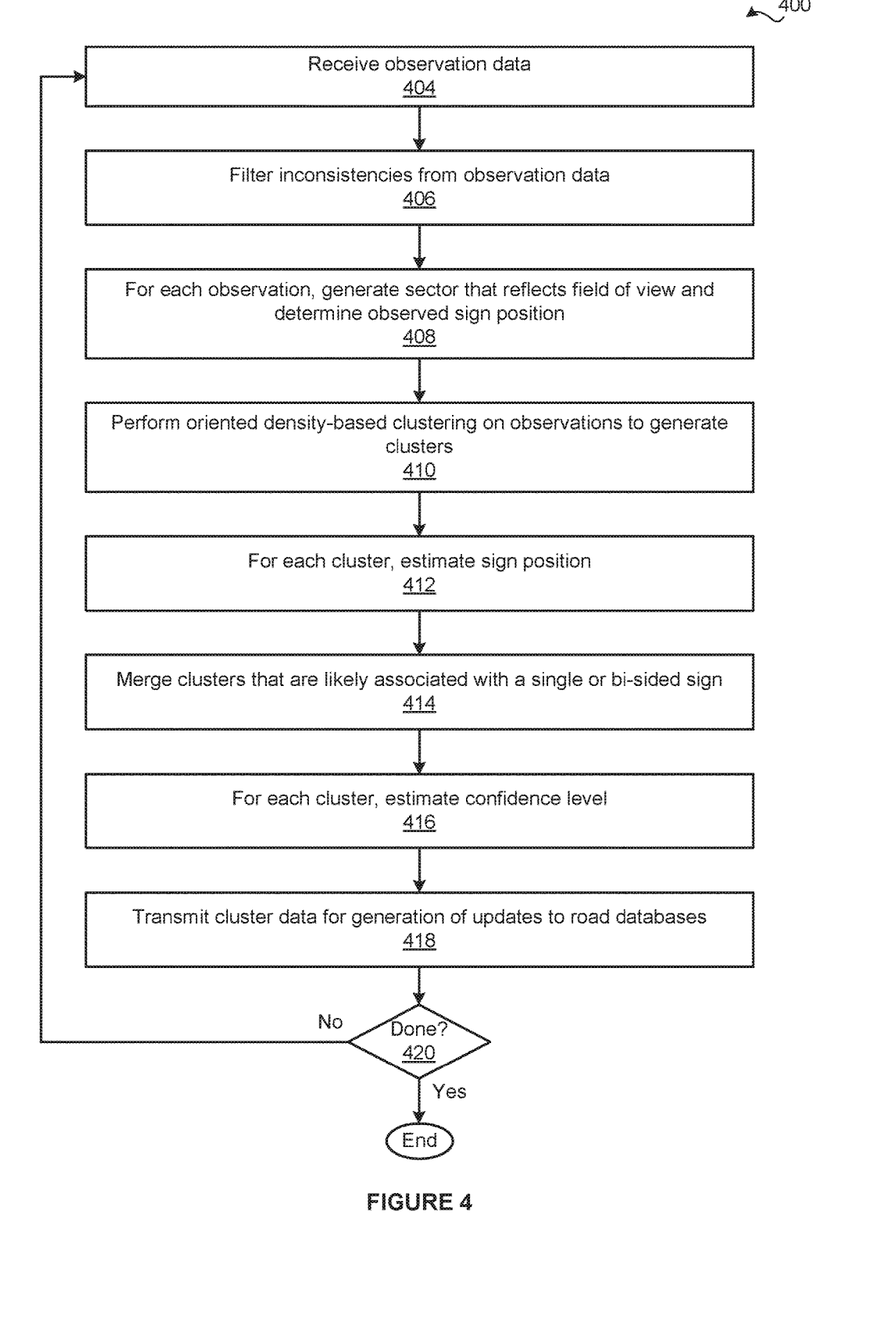
FIG. 4 is a flow diagram of method steps for generating navigation-related data based on multiple observations, according to various embodiments.

FIG. 4 is a flow diagram of method steps for generating navigation-related data based on multiple observations, according to various embodiments. Although the method steps are described in conjunction with the systems of FIGS. 1-3, persons skilled in the art will understand that any system configured to implement the method steps, in any order, falls within the scope of the contemplated embodiments.

As shown, a method 400 begins at step 404, where the cluster application 150 receives the observation data 130. The observation data 130 includes any number of the observations 140 received from any number of the vehicles 120. The cluster application 150 may receive the observation data 130 in any technically feasible fashion. At step 406, the filtering engine 210 identifies and removes inconsistent observations 140 that are included in the observation data 130. For instance, in some embodiments, the filtering engine 210 could identify and remove any of the observations 140 that specify a value of greater than 120 miles per hour for the speed 214.

At step 408, for each of the remaining observations 140, the sectoring engine 220 generates the sector 320 and determines an observed sign position that lies within the sector 320. The sector 320 reflects a field of view of a camera included in the associated vehicle 120. Notably, as the speed 214 increases, the corresponding field of view narrows. At step 410, the cluster engine 230 performs oriented density-based clustering operations on sets of similar observations 140 to generate the clusters 170. As described previously herein, the observations 140 included in each set of similar observations 140 share the same sign type 216 and the same side 218, and have headings 212 that deviate from one another by at most a maximum heading deviation. At step 412, for each of the clusters 170, the cluster positioning engine 240 fits estimated positions of the associated observations 130 to a Gaussian distribution and sets the sign position 280 to the median of the Gaussian distribution.

At step 414, the merging engine 250 identifies and merges any of the clusters 170 that likely correspond to the same physical or logical object. For example, if a logical bi-sided road sign "B" includes a left physical road sign "L" and a right physical road sign "R," then the merging engine 250 could merge the cluster 170(L) that is associated with the left physical road sign "L" and the cluster 170(R) that is associated with the right physical road sign "R" to generate the target cluster 170(M).

At step 416, for each of the clusters 170, the confidence engine 260 computes the associated confidence level 172 that reflects a reliability of any number of the characteristics specified in the cluster 170. For example, the confidence level 172(i) reflects the reliability of the sign position 280(i) included in the cluster 170(i). At step 418, the cluster application 150 transmits the cluster data 160, including the clusters 170 and the associated confidence levels 172, to the update application 180. The cluster data 160 enables the update application 180 to generate the update 190 associated with a road database. In alternate embodiments, the cluster application 150 may transmit any portion of the cluster data 160 to any number and type of applications.

At step 420, the cluster application 150 determines whether the cluster application 150 is to finish operating. If, at step 420, the cluster application 150 determines that the cluster application 150 is to finish operating (e.g., the cluster application 150 has received a command to exit), then the method 400 terminates. If, however, at step 420, the cluster application 150 determines that the cluster application 150 is to continue operating, then the method 400 returns to step 404, where the cluster application 150 receives new observation data 130. Advantageously, the cluster application 150 may be configured to continually receive new observation data 130 and generate new cluster data 160, thereby enabling the update application 180 to continually generate accurate updates 190.

In sum, the disclosed techniques may be used to generate navigation-related data based on clusters that are derived from real-time observations of road signs. A cluster application includes, without limitation, a filtering engine, a sectoring engine, a clustering engine, a cluster positioning engine, a merging engine, and a confidence engine. In operation, the filtering engine receives observation data that includes real-time observations of road signs received from vehicles traveling along roads. The filtering engine identifies and removes any observations that are likely to be inaccurate from the observation data. For each of the remaining observations, the sectoring engine computes a sector that reflects a field of view of the associated vehicle traveling along the specified heading at the specified speed. The sectoring engine then determines an observed sign position based on the sector.

Subsequently, the clustering engine generates clusters of observations, where each cluster characterizes a different sign. The clustering engine implements an oriented density based clustering algorithm based on oriented distances. The clustering engine computes each oriented distance based on the observed sign positions and the reported headings. More specifically, the clustering engine takes into consideration that observations are typically reported by vehicles traveling along roads that coincide with the reported headings. Consequently, each cluster is typically characterized by a rectangular shape that is oriented along a road. Subsequently, for each cluster, the cluster positioning engine estimates a sign position based on fitting the observed sign positions into a Gaussian distribution. The merging engine then identifies and merges any clusters that are likely associated with a single sign or two signs that likely comprise a bi-sided sign. Finally, for each cluster, the confidence engine generates a confidence level based on the number, consistency, and characteristics of the observations included in the cluster.

At least one advantage of the disclosed approach is that because the clustering engine generates each cluster based on multiple error-prone real-time observations of an associated road sign, the clusters characterize road signs more reliably than the observations characterize the road signs. Further, the confidence levels of the clusters enable providers of road databases to identify clusters that meet a reliability criterion. Consequently, the providers of road databases may generate accurate updates to road databases based on the identified clusters. Notably, because the cluster application operates on real-time observations, providers of road databases may produce updates at a frequency that enables navigation applications to continually provide accurate navigation data.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for generating navigation-related data, the method comprising:
   computing a first oriented distance between a first observed object position and a second observed object position based on a first heading, wherein the first observed object position and the first heading are associated with a first observation received from a first vehicle, and the second observed object position is associated with a second observation received from a second vehicle;
   generating, based on the first oriented distance, a first cluster that includes the first observation and the second observation;
   computing an object position associated with the first cluster based on at least the first observation and the second observation; and
   transmitting the object position and at least one characteristic associated with the first observation to an update application, wherein the update application generates an update to a road database.

2. The method of claim 1, wherein generating the first cluster comprises performing one or more density-based clustering operations on a plurality of observations based on the first oriented distance, wherein the plurality of observations include at least the first observation and the second observation.

3. The method of claim 1, wherein the at least one characteristic comprises a speed limit.

4. The method of claim 1, further comprising transmitting a confidence level to the update application, wherein the confidence level indicates a reliability of the object position.

5. The method of claim 4, further comprising computing the confidence level based on at least one of a number of observations included in the first cluster, a number of observations included in a plurality of clusters that includes the first cluster, and a last observation time associated with the first cluster.

6. The method of claim 1, further comprising, prior to computing the first oriented distance:
   computing a first sector based on the first heading, a first speed, and a first vehicle position, wherein the first speed and the first vehicle position are included in the first observation, and
   determining the first observed object position based on the first sector.

7. The method of claim 1, wherein computing the object position comprises fitting at least the first observed object position and the second observed object position to a Gaussian distribution and setting the object position to a median of the Gaussian distribution.

8. The method of claim 1, further comprising, prior to generating the first cluster:
   determining that a third observation is inconsistent with a plurality of observations that includes the first observation and the second observation, and
   in response, discarding the third observation.

9. A non-transitory computer-readable storage medium including instructions that, when executed by a processor, configure the processor to generate navigation-related data by performing the steps of:
   computing a first observed object position based on a first heading, a first speed, and a first vehicle position, wherein the first heading, the first speed and the first vehicle position are associated with a first observation;
   computing a first oriented distance between the first observed object position and a second observed object position based on the first heading, wherein the second observed object position is associated with a second observation;
   generating, based on the first oriented distance, a first cluster that includes the first observation and the second observation;
   computing an object position associated with the first cluster based on at least the first observed object position and the second observed object position; and
   transmitting the object position and at least one characteristic associated with the first observation to an update application, wherein the update application performs one or more update operations associated with a road database.

10. The computer readable medium of claim 9, wherein generating the first cluster comprises performing one or more density-based clustering operations on a plurality of observations based on the first oriented distance, wherein the plurality of observations include at least the first observation and the second observation.

11. The computer readable medium of claim 9, further comprising transmitting a confidence level to the update application, wherein the confidence level indicates a reliability of the object position.

12. The computer readable medium of claim 9, wherein computing the object position comprises fitting at least the first observed object position and the second observed object position to a Gaussian distribution and setting the object position to a median of the Gaussian distribution.

13. The computer readable medium of claim 9, further comprising, prior to generating the first cluster, determining that a third observation is inconsistent with a physical characteristics associated with vehicles, and, in response, discarding the third observation.

14. The computer readable medium of claim 9, further comprising:
determining that a second cluster and a third cluster are associated with a single logical object;
merging the second cluster and the third cluster to generate a fourth cluster; and
transmitting at least one characteristic associated with the fourth cluster to the update application.

15. The computer readable medium of claim 14, further comprising:
computing a first confidence level based on a number of observations included in the second cluster;
determining that the second cluster is associated with a left side and the third cluster is associated with a right side;
reducing the first confidence level to generate a second confidence level that indicates a reliability of the at least one characteristic; and
transmitting the second confidence level to the update application.

16. The computer readable medium of claim 15, further comprising:
computing a first confidence level based on a number of observations included in the second cluster;
determining that the second cluster is associated with both a left side and a right side; and
transmitting the first confidence level to the update application to indicate a reliability of the at least one characteristic.

17. A system for generating navigation-related data, the system comprising:
a memory storing a cluster application; and
a processor coupled to the memory, wherein when executed by the processor, the cluster application configures the processor to:
compute a first oriented distance between a first observed object position associated with a first observation and a second observed object position associated with a second observation based on a first heading;
perform one or more density-based clustering operations on a plurality of observations based on a plurality of oriented distances to generate a first cluster that includes the first observation and the second observation, wherein the plurality of oriented distances includes the first oriented distance;
compute an object position associated with the first cluster based on at least the first observation and the second observation; and
transmit the object position and at least one characteristic associated with the first observation to at least one of a navigation application and an update application, wherein the update application generates an update to a road database.

18. The system of claim 17, wherein, when executed by the processor, the cluster application further configures the processor to transmit a confidence level to the at least one of the navigation application and the update application, wherein the confidence level indicates a reliability of the object position.

19. The system of claim 17, wherein the cluster application configures the processor to compute the object position by fitting at least the first observed object position and the second observed object position to a Gaussian distribution and setting the object position to a median of the Gaussian distribution.

20. The system of claim 17, wherein the at least one characteristic comprises a speed limit.

* * * * *